United States Patent [19]
Henningsen et al.

[11] Patent Number: 4,611,290
[45] Date of Patent: Sep. 9, 1986

[54] COMPUTER CONTROLLED DIESEL ENGINE FIRE PUMP CONTROLLER

[75] Inventors: Lee A. Henningsen; Quentin J. Gardiner, both of Cary, N.C.

[73] Assignee: Firetrol, Inc., Cary, N.C.

[21] Appl. No.: 544,443

[22] Filed: Oct. 21, 1983

[51] Int. Cl.⁴ .................. G06F 15/72; G05D 16/20; F04B 49/06
[52] U.S. Cl. ..................................... 364/510; 169/13; 239/DIG. 15; 364/558; 417/34; 417/63
[58] Field of Search ............... 364/510, 550, 551, 558; 361/31, 96; 307/118; 239/332, DIG. 15; 169/13; 417/34, 63

[56] References Cited

U.S. PATENT DOCUMENTS

| | | | |
|---|---|---|---|
| 3,599,867 | 8/1971 | Griswold et al. | 239/DIG. 15 |
| 3,859,565 | 1/1975 | Hennigsen | 307/118 X |
| 3,878,376 | 4/1975 | Sholes et al. | 364/558 X |
| 4,184,205 | 1/1980 | Morrow | 364/550 X |
| 4,398,258 | 8/1983 | Naitoh et al. | 364/551 |
| 4,492,525 | 1/1985 | Bilyeu | 417/34 |

Primary Examiner—Felix D. Gruber
Attorney, Agent, or Firm—Collard, Roe & Galgano

[57] ABSTRACT

An automatic self contained internal combustion engine fire pump controller for testing and operating an internal combustion engine coupled to a water pump for maintaining water pressure in a sprinkler system. The sprinkler system includes a deluge valve for reducing the water pressure, and the engine has a starter motor, a starter solenoid connected to the battery, and a separate fuel supply. A housing contains the controller, and includes a selector switch having at least a manual run position, and an automatic run position. A fuel valve controls the fuel supply to the internal combustion engine. A pressure transducer senses the fluid pressure of the sprinkler system and has its input connected to the central processing unit. A central processing unit is responsive to the automatic position of the switch and is coupled to the fuel valve, the deluge valve and the pressure transducer means. There is also a keyboard programmer coupled to the central processing unit for setting the clock time, the engine start time, the engine stop time, the test time for the engine, and for setting the predetermined pressure to start the engine. When the selector switch is set to the automatic position, the central processing unit, in response to the program preset by said keyboard programmer, and at a preset test time, opens the deluge valve to cause a pressure drop in the sprinkler system fluid, and at a preset pressure drop sensed by said pressure transducer, operates the starter solenoid to connect the battery to the starter motor to automatically start the engine, maintain the engine running for a preset time interval, and then operate said fuel valve to cut off the fuel to shut down the engine.

16 Claims, 6 Drawing Figures

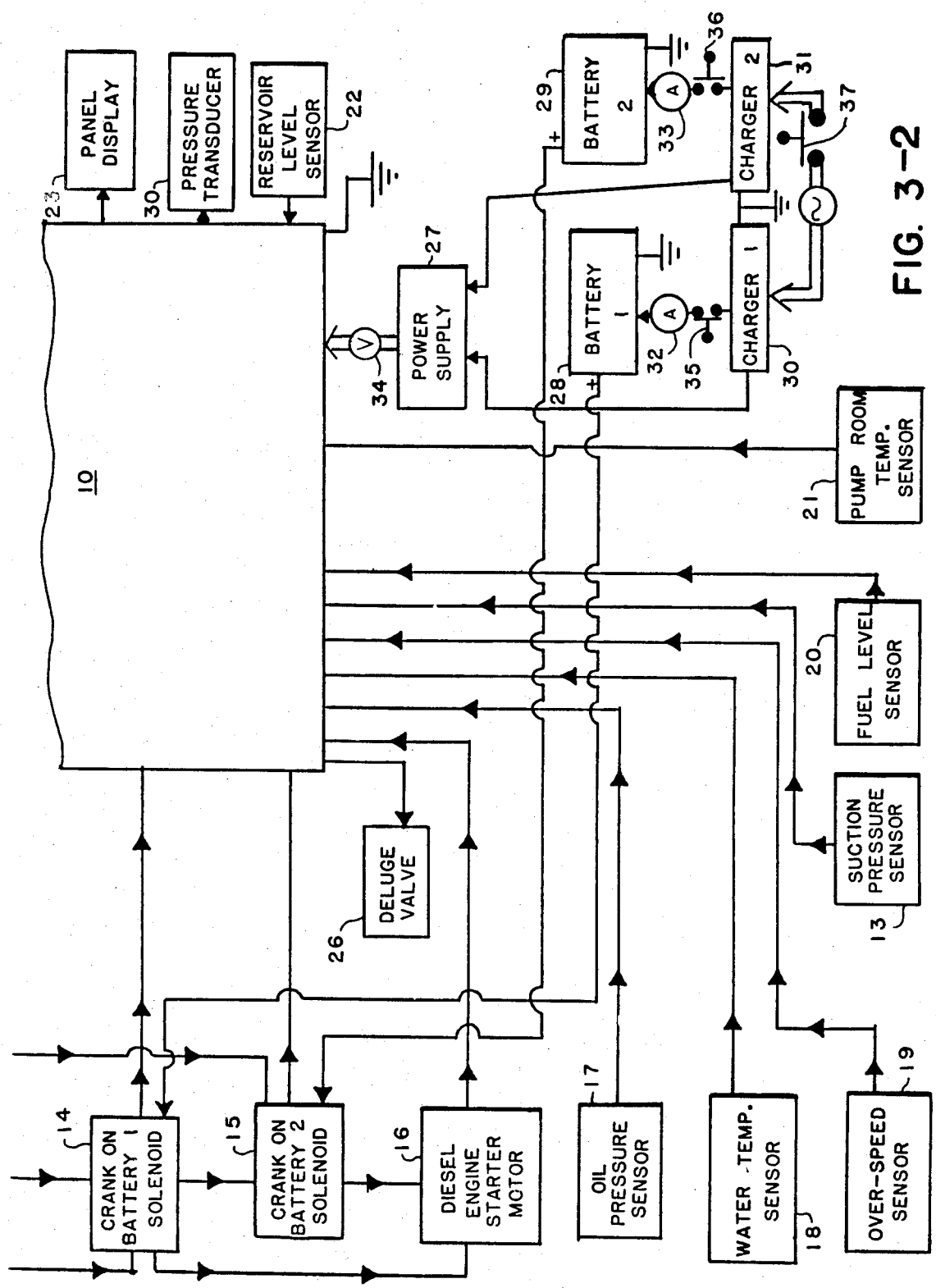

COMPUTER CONTROLLED DIESEL ENGINE FIRE PUMP CONTROLLER

This invention relates to an improved diesel engine fire pump controller and more particularly to an automatic computer controlled fire pump controller for operating diesel engines.

Fire pump control apparatus which are generally located in multi-story buildings are responsible for turning on the sprinkler water pumps in the event that a fire starts in the building and supplying high pressure water to the sprinklers to put the fire out. If operated properly, sprinklers will put out the fire in 98% of the time, before the fire department reaches the fire.

In locations where the supply of electrical power is limited, buildings may use diesel engines to pump the water to the sprinkler heads. Diesel engines used in conjunction with fire pump controllers are regulated by the National Fire Protection Association Code 20, namely Chapters 8 and 9. Generally, the Code requires that the diesel engines be tested once a week for thirty minutes in response to a drop in water pressure in the sprinkler water lines.

Conventional diesel engine fire pump controllers employ generally relays and mechanical timers to test the diesel engine at least once a week. During the test operation, numerous readings are taken of the water pressure, diesel fuel level, the number of times the diesel engine was started before it reached full running operation and the temperature of the diesel engine during full load operation.

With the availability of certain computer circuits, it is now possible according to the invention to improve the diesel engine fire pump controller so that many of the read-outs and operating functions can be performed electronically and automatically and provide the user with a great deal of flexibility in the operation of the controller. Moreover, with the use of electronic finger controlled keyboard touch pads connected to the computer, it is possible to pre-program a number of different test conditions into the controller, and observe the operation of the apparatus with the aid of a display.

Accordingly, it is an object of the present invention to provide a diesel engine fire pump controller which has a direct read-out, monitoring and diagnostic systems which are compatible with all existing codes.

It is another object of the present invention to provide a diesel engine fire pump controller which is simple in design, and reliable in operation.

Other objects and features of the present invention will become apparent from the following detailed description considered in connection with the accompanying drawings which disclose the embodiments of the invention. It is to be understood, however, that the drawings are designed for the purpose of illustration only and not as a definition of the limits of the invention.

In the drawings wherein similar reference characters denote similar elements throughout the several views:

FIGS. 3-1 and 3-2 are an electrical block diagram showing the diesel engine fire pump controller of the present invention; and FIGS. 4-1 and 4-2 are a flow chart diagram of the diesel engine fire pump controller of FIG. 1.

Figure 1:
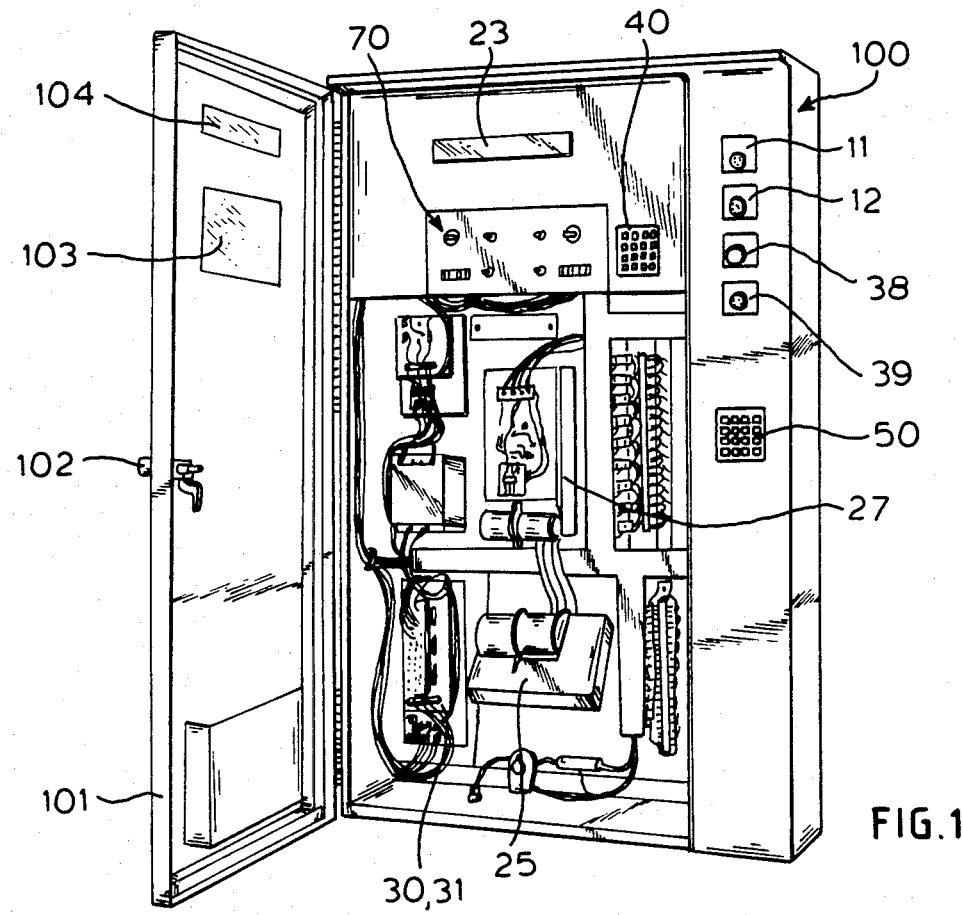
FIG. 1 is a perspective view of the diesel engine fire pump control system according to the invention with the front cover of the cabinet opened to show the components of the system.

Referring to FIG. 1, there is shown a perspective view of a computer controlled diesel engine pump monitoring, diagnostic and control system located in cabinet 100. Inside the cabinet are displayed various components such as battery chargers 30 and 31, printer 25, power supply 27, digital display 23, and control panel 70. Mounted on the external surface of the cabinet are pushbuttons 11 and 12 to crank the diesel engine on either batteries 1 or 2, respectively. There is mounted below pushbuttons 11 and 12 a stop button 38 which will stop the diesel engine from running when in auto position and all sensing causes are satisfied as well as an audible alarm 39. There is also shown an internal keyboard touch pad 40 as well as an externally mounted keyboard touch pad 50 which are coupled to the computer mounted inside the unit.

Figure 2:
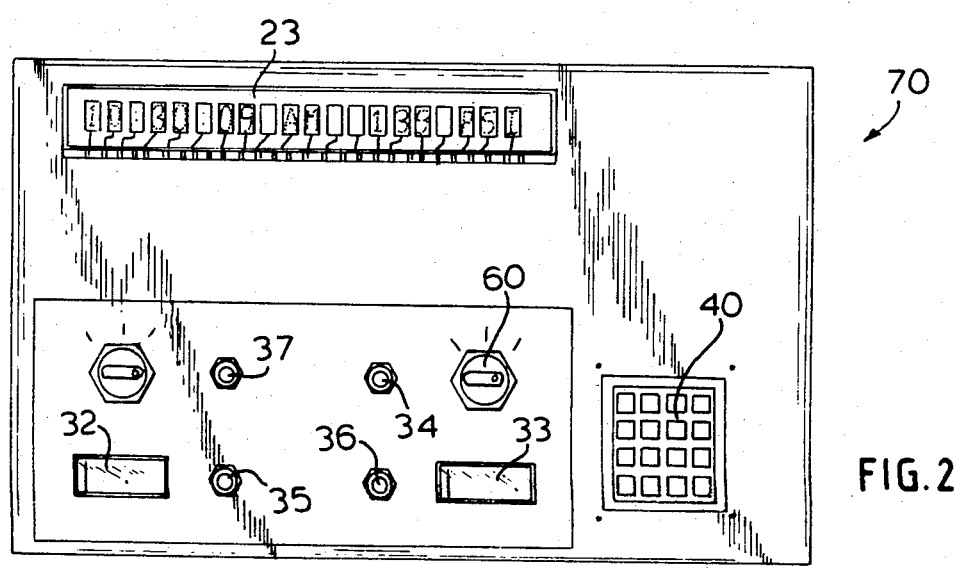
FIG. 2 is a detailed view of the control panel with display and keyboard touch pad located inside the cabinet of the system of FIG. 1.

FIG. 2 shows in detail a portion of the upper panel of the cabinet of FIG. 1 wherein the system is provided with battery current monitors 32 and 33 for measuring the charging current for each of the two batteries in the system, circuit breakers 35 and 36 for controlling the charging current to the batteries. There is also provided an AC power circuit breaker 37 and a computer power circuit breaker 34. A selector switch 60 permits the control system to be operated on either manual or automatic operation or to be shut off completely for servicing.

Figures 1, 3:
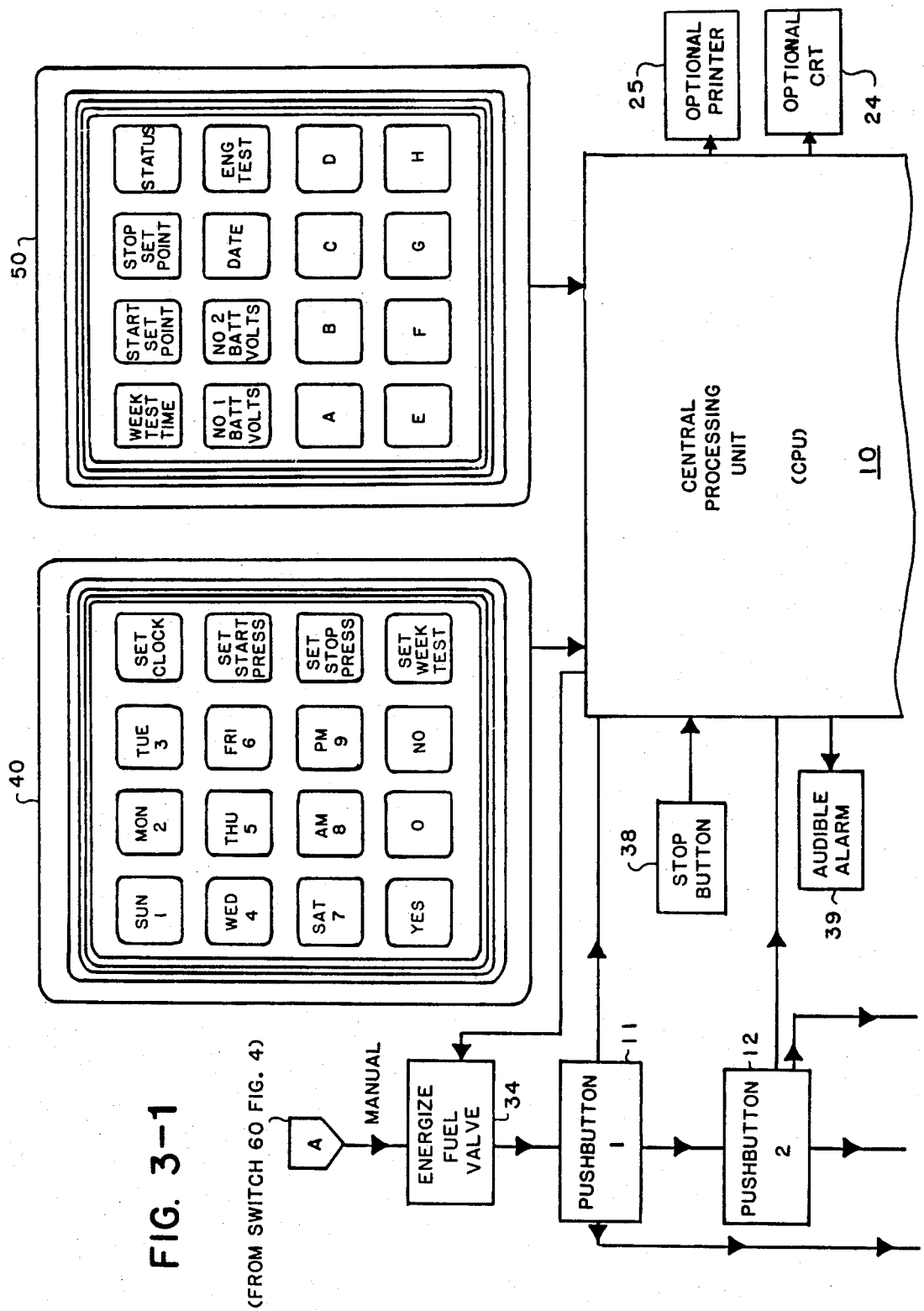

Referring to FIGS. 3-1 and 3-2, there is shown an electrical block diagram in simplified form of the control circuit for the diesel pump controller system of the present invention. A central processing unit (CPU) 10 consisting of a computer circuit has various RAM and ROM component chips capable of being programmed by several external sources. One such circuit that has been used is the RCA CDP18S602 microboard computer which can be programmed by external keyboard touch pad controls so that the setup data including time, day, date, start/stop pressure set points, and the weekly test schedule can be put into the circuit.

If selector switch 60 is set to its "manual" position, a fuel valve 34 will be energized to permit diesel fuel to be connected to the diesel engine (not shown). Fuel valve 34 is coupled to push button 11 which is coupled to both CPU 10 and to a crank-on battery solenoid 14. Between crank-on battery solenoid 14 and push button 11, there is shown a second push button 12 which is also coupled to the CPU and to a second crank-on battery solenoid 15. The diesel engine starter motor 16 is coupled to both crank-on battery solenoids 14 and 15 so that the engine can be started from either the first battery 28 or the second battery 29 as required by the NFPA Code 20. An additional feature of the invention is that if the battery power is low, the diesel engine can also be started if both pushbuttons 11 and 12 are depressed, so that both batteries can be connected to starter motor 16.

In this system of the invention, there is provided two chargers 30 and 31 having their inputs coupled to the AC power such as 110 volts 60 cycle power and protected by circuit breaker 37. At the output of each charger is a circuit breaker 35 or 36 which is fed in series to current ammeters 32 or 33 into batteries 28 and 29, respectively. Another output of chargers 30 or 31 is also coupled to the input of a power supply 27 so that DC power can be fed to CPU 10 to supply current to all of the sensing circuits and the memory of the system. Batteries 28 and 29 can also be coupled to power supply 27 so that the central processing unit 10 will continue to function if there are interruptions in the AC power.

Coupled to the input of CPU 10 is also an oil pressure sensor 17, diesel engine water temperature sensor 18 and an engine overspeed sensor 19 coupled to the output shaft of the diesel engine. CPU 10 can also monitor the pump suction pressure through sensor 13 located at the input of the water pump driven by the diesel engine. The fuel level of the diesel fuel contained in an external storage tank for the diesel engine can be monitored by the CPU by connecting it to sensor 20. The CPU also measures the temperature of the pump room through sensor 21 and reservoir level through sensor 22. CPU 10 is also coupled to a display 23 which can be seen from the front panel of the fire pump controller and may consist of an illuminated dot matrix alphanumeric display to indicate to the operator, which step of the operating procedure is currently being performed. CPU 10 is also capable of operating a CRT (cathode ray tube) 24 and on-line printer-recorder 25 that can print out all of the system conditions as they are being operated or diagnosed. Connected also to CPU 10 is a pressure transducer 30 which measures the output pressure of the pump connected to the diesel engine. The two keyboard touch pads 40 and 50 are also coupled to the input of the CPU.

The system also includes a deluge valve 26 coupled to CPU 10 to permit water to be drained from the sprinkler system in response to a command from the central processing unit. This will create a resultant pressure drop to be sensed by pressure transducer 30 so that the system will turn "on" automatically, or can be tested in accordance with the NFPA 20 Code.

Internal touch pad 40, connected to CPU 10, has sixteen buttons as shown in detail, to permit an authorized operator to set the day of the week and the exact time for the weekly test of the diesel engine as well as set the clock and the starting sequence. The touch pad consists of membrane switches mounted on printed circuit boards, so that the boards are completely isolated from the operator. The operator can also set the time duration in which the diesel engine is to be run, the number of starting sequences for the diesel engine, their duration and time separation. Internal touch pad 40 also permits the authorized operator to set the pressure at the output of the pump which will turn on the diesel engine and the pressure range which the pump will operate at full load. Once the authorized operator sets up the operating conditions for the control system of the invention, cabinet cover 101 can be closed and locked by means of handle 102 as shown in FIG. 1 so that unauthorized personnel will not have access to touch pad 40. Windows 103 and 104 mounted in cabinet door 101 will permit operators to still view the settings on control panel 70 and the readings on display 23, when the cabinet door is closed and locked.

External touch pad 50, shown in FIG. 3-1, also has sixteen touch pad buttons which are accessible from the outside of the cabinet of the controller, and permits one to check the controller for the weekly test time, the starting point of the test, the stop set point, the status of the controller, the voltage of both batteries 14 and 15, the present date and time, and test the engine. The operation of the external test pad will not change any of the settings that have been pre-programmed into the internal touch pad 40. In an actual embodiment, both touch pads were Gray Hill touch pads 88BB2-072.

Figures 1, 4:
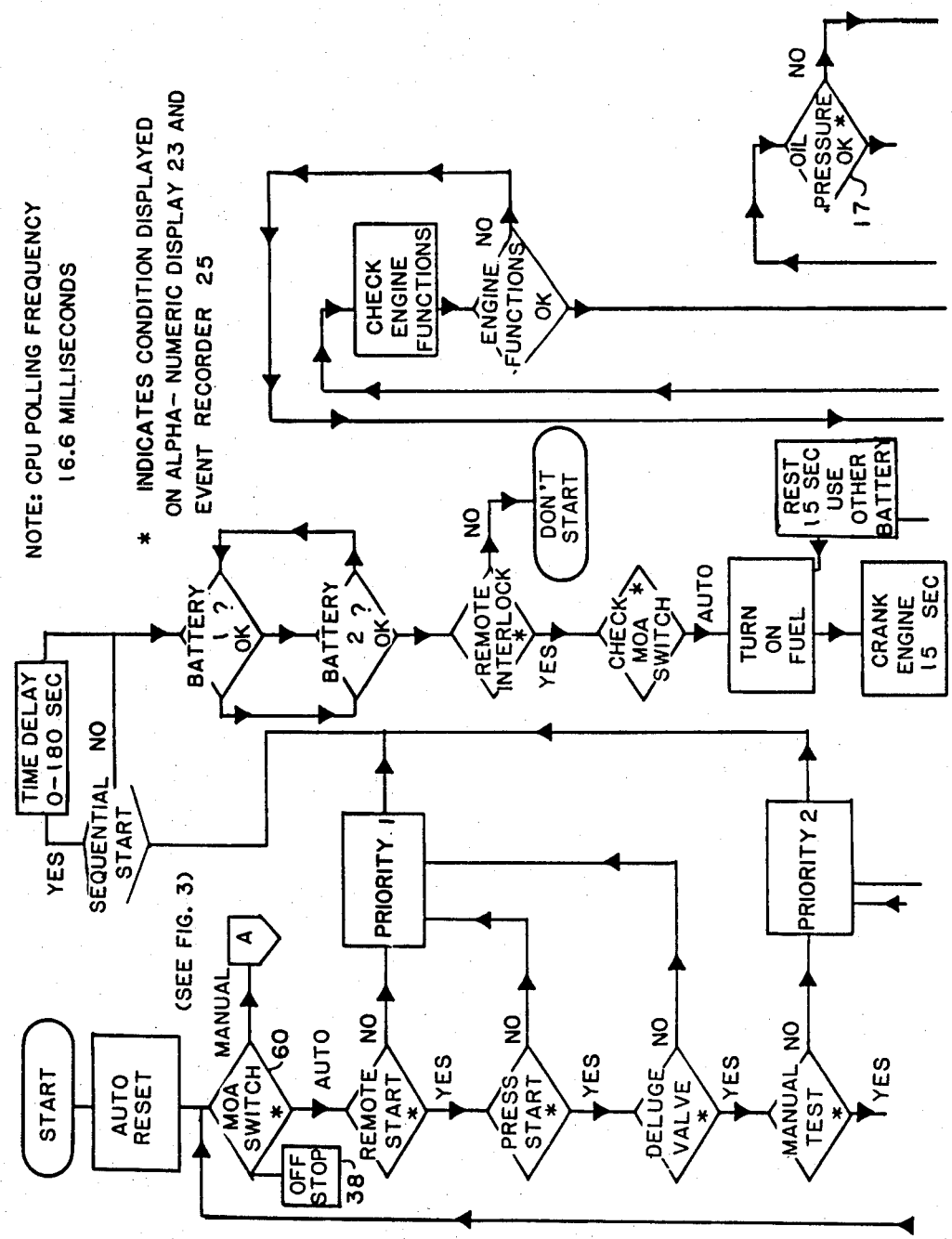
Figures 2, 4:
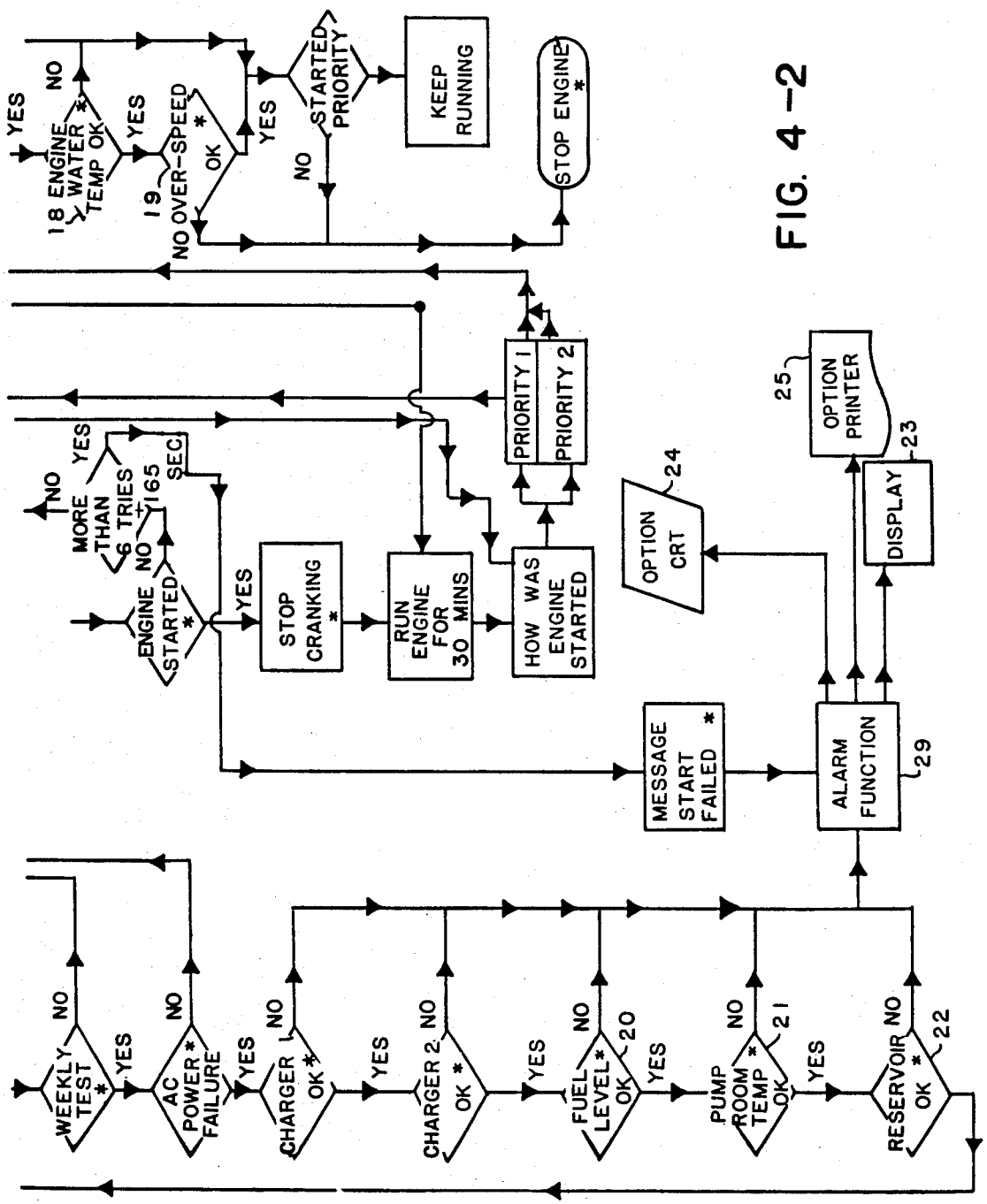

The following is the sequence of operation of the controller according to the invention:

Referring to FIGS. 4-1 and 4-2, there is shown an algorithm diagram which illustrates the sequence of operation of the system controlled by CPU 10. Upon initial set up of the inventive computer based engine controller, when the manual-off-auto switch 60 is in the "automatic" position, CPU 10 monitors all inputs to the controller through the input/output. The CPU polling frequency is sixteen (16) times per second, defining one complete cycle. When switch 60 is in the "automatic" position, CPU 10 monitors all input starting causes and alarm functions. Starting causes can be broken down into two divisions, priority 1 and priority 2. Starting causes from priority 1 include; remote start, pressure drop in system, or deluge valve open, all of which are classified as essential starts. A priority 2 start can be caused by manual test, weekly test, or an AC power failure. Upon a priority 1 start, the controller senses an input signal from a remote start, a pressure drop in the system, or a deluge valve open, and automatically starts a cranking cycle on the batteries. The CPU 10 makes a decision as to whether or not a system start act is required, including checking on battery voltages for battery 1 and battery 2. The CPU remembers the battery used for cranking previously, and cranks only on the other battery. The battery condition can only be tested with a load; therefore if CPU 10 detects the battery voltage of batteries 28 and/or 29 of 50% below nominal voltage during a cranking cycle, it will stop cranking on that battery, and lock on the other battery. When the engine is started, a remote signal from the engine is sent back to the controller to terminate the cranking cycle. After engine start, CPU 10 continues to check all inputs to the input/output circuits and monitor all engine functions. When the engine is started by a priority 1, no alarms nor engine failures will stop the engine except for engine overspeed. A priority 2 start will sequence the same as priority 1 start, except CPU 10 recognizes by the input whether it was started by manual test, weekly test, or AC power failure. Under this condition, the engine will cease to run if there is an engine malfunction, such as low oil pressure, high water temperature or engine overspeed.

A crank cycle of priority 1 or priority 2, start operates as follows: The engine will crank from either battery 1 or battery 2 for a maximum of 15 seconds. A 15 second rest period is required between cranks to dissipate enough heat from the starting motor so it may be cranked again. After a 15 second rest, another 15 second starting crank is attempted on the opposite battery. This starting sequence is continued 15 seconds on, and 15 seconds off, rotating batteries for a maximum of 165 seconds (see FIGS. 4-1 and 4-2). If there is no engine run signal by this time, the controller will sound alarm 29. Moreover, a message will be displayed "ENGINE FAILED TO START", on display 23, and time and date will be recorded on display 23, optional printer 25, and optional CRT 24. If the controller does not recognize an engine run cause, the engine will continue to run for the minimum running time of 30 minutes. After the 30 minutes of minimum running time, provided all start causes have been corrected and the pressure is at stop set point, the engine will automatically shutdown. If, however, the start causes have not been corrected or satisfied or the pressure has not been satisfied to set point, the engine will continue to run. The only way to shutdown the engine in this condition is to turn manual-off-auto switch 60 to the "off" position.

When manual-off-auto switch 60 is in the "automatic" position, all start causes, stop causes and alarm functions are monitored and documented on display 23, optional printer 25 and optional CRT 24. Optional printer 25 provides a hard copy of the continuous performance of the controller. In the monitor or standby mode, the pressure, time and date are automatically printed out on optional printer 25 every half hour on the hour. When the controller is in a run mode, monitoring all functions, the pressure, time and date are printed every 15 seconds to maintain a continuous record of the pressure during a run cycle.

When manual-off-auto switch 60 is in the "manual" position, the operator immediately energizes the fuel valve, and cranking is done by pushbutton 11 and pushbutton 12, which energizes starting contactors 14 or 15 on the engine. The engine can only be started in manual operation by bypassing all the electronics and system controls. When the system is run in the "manual" position, the controller and CPU continue to monitor all engine functions, including oil pressure, water temperature and engine overspeed through sensors 17, 18, and 19, and will alarm through the input/output. It will still document and record all necessary data such as time, date and pressure, as well as how the engine was started. The only method of turning off the engine during manual run mode is to turn a manual-off-auto switch 60 to the "off" position. This de-energizes fuel valve 34 and starves the engine of fuel. In the manual position all start causes alarms and options to be recorded on display 23, optional CRT 24, and optional printer 25. In the "manual" position, there is no automatic shutdown, so that the engine must be shut off by use of the manual-off-auto switch 60.

During an engine run in either the automatic or manual modes, the operator has the option of calling up information on display 23, through the use of the outside keypad 50 shown in FIG. 3-1.

When the manual-off-auto switch 60 is in "automatic" mode, the CPU monitors all inputs to the input/output circuits. The software of the CPU is written in such a way as to determine whether or not the battery chargers and/or the batteries are operating correctly. It will also make a decision and determine whether someone is tampering with the batteries. A true indication of a charger failure, or a missing battery can be made.

Regardless of which priority is taken, the system will also check deluge valve 26, the weekly test program, check for a power failure, and make sure that chargers 30 and 31, the fuel level, pump room temperature and the reservoir meet satisfactory test requirements before the engine is turned on. If for any reason the engine fails to start after going through the several starting tries, display 23 will flash the message "START FAILED" and also sound alarm 29. Printer 25 will also print a record of this engine failure and the number of times that attempts were made to start the engine. In each of the boxes marked with an asterisk (*) in FIGS. 4-1 and 4-2, alphanumeric display 23 will indicate the condition displayed at any instance during the test or starting procedure.

What is claimed is:

1. An automatic self contained internal combustion engine fire pump controller for testing and operating an internal combustion engine coupled to a water pump for maintaining water pressure in a sprinkler system, said sprinkler system including a deluge valve for reducing the water pressure, said engine having a starter motor and at least one starter solenoid connected to at least one battery, and a separate fuel supply, comprising:
    a housing for containing the controller;
    a selector switch means disposed in said housing and having at least a manual run position, and an automatic run position;
    means for controlling the fuel flow from the fuel supply to the the internal combustion engine;
    pressure transducer means for sensing the fluid pressure of said sprinkler system;
    deluge valve means coupled to the water pressure of the sprinkler system for decreasing the water pressure therein;
    central processing means responsive to the automatic position of said switch means and coupled to said means for controlling the fuel flow, said deluge valve and said pressure transducer means;
    keyboard programming means coupled to said central processing means for setting the clock time, the engine start time, the engine stop time, the set time for the engine, and for setting the predetermined pressure to start the engine;
    so that when said selector switch means is set to the automatic position, said central processing unit in response to the program preset by said keyboard programming means and at a preset test time, opens the deluge valve to cause a pressure drop in the sprinkler system fluid, and at a preset pressure drop sensed by said pressure transducer means, operates the starter solenoid to connect the battery to the starter motor to automatically start the engine, maintain the engine running for a preset time interval, and then operate said fuel control means to cut off the fuel to shut down the engine.

2. The controller as recited in claim 1 additionally comprising at least one starting button mounted on said housing and coupled to the starter solenoid so that when said selector switch means is set to the manual position, the solenoid will close in response to said starting button to connect the battery to the starter motor to start the engine.

3. The controller as recited in claim 1 additionally comprising a panel display mounted on said housing and coupled to said central processing unit for displaying the status of the test and operating procedure of the engine.

4. The controller as recited in claim 1 additionally comprising a printer mounted on said housing and coupled to said central processing unit for printing the status of the test and operating procedure of the engine.

5. The controller as recited in claim 3 additionally comprising a second keyboard means mounted on said housing and coupled to said central processing unit, said second keyboard means including keys for checking the program preset by said first keyboard means and displaying the program setting on said display panel.

6. The controller as recited in claim 5, additionally comprising an engine oil pressure sensor and an engine water temperature sensor and an over-speed sensor coupled to the engine and having their outputs connected to said central processing unit.

7. The controller as recited in claim 6, additionally comprising a suction pressure sensor for sensing the pressure at the suction side of the water pump, and having its input coupled to said central processing unit.

8. The controller as recited in claim 6, wherein said central processing unit is programmed with an algorithm having a first starting priority and a second starting priority, said second starting priority being established in response to either the manual test operated by the starting button, or by the preset timed test to initiate the starting and running procedure of the engine, the central processing unit thereafter stopping the engine if the engine temperature or oil pressure as sensed by said oil and temperature sensors reaches a predetermined unsafe operating level.

9. The controller as recited in claim 8, wherein said first starting priority is established in response to a predetermined drop in pressure of the sprinkler system independent of the testing procedure so as to initiate the starting and running procedure of the engine, the controller thereafter causing the engine to continue to run regardless of the settings of said temperature and oil pressure sensors.

10. The controller as recited in claim 9, wherein the engine includes two solenoids and two batteries, and wherein said algorithm includes a multiple starting sequence so that the central processing unit initially turns on a first solenoid connected to the first battery to start the engine for up to 15 seconds, and if that fails, to rest for 15 seconds, and then subsequently turns on the second solenoid to connect the second battery to the engine starter motor for up to 15 seconds, and if that fails to rest for 15 seconds and thereafter to repeat the sequence between the first and second solenoid five additional times before shutting down.

11. The controller as recited in claim 10 additionally comprising at least one battery charger having its input connected to an AC supply and its output connected to the batteries.

12. The controlller as recited in claim 10 additionally comprising an alarm, mounted on said housing and coupled to said central processing unit for providing an audible alarm and for providing a display of the fault in response to said fuel control means, and the battery charger in the event of low fuel level or low charging or battery voltage.

13. The controller as recited in claim 10 additionally comprising a suction pressure sensor coupled to said central processing unit for monitoring the suction pressure at the input of the water pump.

14. The controller as recited in claim 12 additionally comprising a pump room temperature sensor coupled to the central processing unit and said audible alarm, so as to sound the audible alarm at a predetermined pump room temperature level.

15. The controller as recited in claim 10 additionally comprising a cathode ray tube coupled to the central processing unit for monitoring the status of said controller during tests and operation.

16. The controller as recited in claim 1, wherein said pressure transducer means comprises an adjustable pressure transducer coupled to the central processing unit with high and low pressure settings, said settings being programmable by means of said keyboard programming means.

* * * * *